US006308051B1

(12) United States Patent
Atokawa

(10) Patent No.: US 6,308,051 B1
(45) **Date of Patent: *Oct. 23, 2001**

(54) ANTENNA DUPLEXER

(75) Inventor: Masayuki Atokawa, Kanazawa (JP)

(73) Assignee: Murata Manufacturing Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,197

(22) Filed: Oct. 5, 1998

(30) Foreign Application Priority Data

Oct. 17, 1997 (JP) .................................................. 9-285674

(51) Int. Cl.[7] ...................................................... H04B 1/46

(52) U.S. Cl. ................................ 455/78; 455/83; 370/24; 370/38; 333/207

(58) Field of Search .................................... 455/78, 277.1, 455/79, 275, 82, 83, 80, 81, 127, 84, 90, 73, 129, 121, 107, 269; 333/103, 104, 202, 100, 101, 134, 124, 102, 262, 110, 246, 204, 125–129, 132–136, 24.2, 205–207; 370/24, 30, 32, 38

(56) References Cited

U.S. PATENT DOCUMENTS

| | | | | |
|---|---|---|---|---|
| 4,509,165 | * | 4/1985 | Tamura | 370/38 |
| 5,023,866 | | 6/1991 | DeMuro . | |
| 5,023,935 | * | 6/1991 | Vancraeynest | 455/80 |
| 5,065,120 | | 11/1991 | Munn . | |
| 5,193,218 | * | 3/1993 | Shimo | 455/80 |
| 5,254,962 | | 10/1993 | Shanley et al. . | |
| 5,387,886 | * | 2/1995 | Takalo et al. | 333/101 |
| 5,442,812 | * | 8/1995 | Ishizaki et al. | 455/82 |
| 5,499,000 | * | 3/1996 | Morikawa et al. | 333/104 |
| 5,513,382 | * | 4/1996 | Agahi-Kasheh et al. | 455/83 |
| 5,521,561 | * | 5/1996 | Yrjola et al. | 333/103 |

(List continued on next page.)

FOREIGN PATENT DOCUMENTS

| | | | | |
|---|---|---|---|---|
| 0367061 | | 5/1990 | (EP) . | |
| 0680108A1 | * | 4/1995 | (EP) | H01P/1/213 |
| 0729239A1 | * | 8/1996 | (EP) | H04B/1/44 |
| 0910132A2 | * | 8/1996 | (EP) | H01P/1/213 |
| 0287671 | | 11/1998 | (EP) . | |
| 405095204A | * | 4/1993 | (JP) | H01P/1/213 |
| 8111603 | | 8/1996 | (KR) . | |

OTHER PUBLICATIONS

Patent Abstracts of Japan vol. 12, No. 211, Jun. 16, 1998 & JP 63 009303 Jan. 16, 1988.

Patent Abstracts of Jaan vol. 1997, No. 07 Jul. 31, 1997 & JP 09 083214 Mar. 28, 1997.

*Primary Examiner*—Daniel Hunter
*Assistant Examiner*—Pablo Tran
(74) *Attorney, Agent, or Firm*—Ostrolenk, Faber, Gerb & Soffen, LLP

(57) ABSTRACT

A transmitting circuit 25 is provided with a frequency variable bandwidth blocking filter circuit 27 and a phase shifter 29. A series circuit of variable bandwidth capacitors C3, C4 and PIN diodes D1, D2 is electrically connected in parallel to resonators 2,3 of the frequency variable bandwidth blocking filter circuit 27. The transmitting circuit 25 can have two different passing bands by grounding or opening the variable bandwidth capacitors C3,C4 by controlling the voltage to be applied to an electric control terminal CONT1. A receiving circuit 26 is provided with a frequency variable trap circuit 28, the phase shifter 29, and a surface acoustic wave filter circuit 30. The surface acoustic wave filter circuit 30 comprises two surface acoustic wave filter elements 11,12 whose passing band is different from each other.

5 Claims, 10 Drawing Sheets

U.S. PATENT DOCUMENTS

| | | | | |
|---|---|---|---|---|
| 5,534,829 | * | 7/1996 | Kobayashi et al. | 333/126 |
| 5,541,560 | * | 7/1996 | Turunen et al. | 333/207 |
| 5,594,394 | * | 1/1997 | Sasaki et al. | 333/103 |
| 5,604,470 | * | 2/1997 | Atokawa | 333/126 |
| 5,678,199 | * | 10/1997 | Birth et al. | 455/80 |
| 5,686,873 | * | 11/1997 | Tada et al. | 333/134 |
| 5,768,692 | * | 6/1998 | Kwak | 455/83 |
| 5,789,998 | * | 8/1998 | Kim et al. | 333/134 |
| 5,818,880 | * | 10/1998 | Kriz et al. | 375/306 |
| 5,903,820 | * | 5/1999 | Hagstrom | 455/82 |
| 5,987,308 | * | 11/1999 | Ookita | 455/83 |
| 6,085,071 | * | 7/2000 | Yamada et al. | 455/82 |

* cited by examiner

ANTENNA DUPLEXER

BACKGROUND OF THE INVENTION

1. Field of the Invention

The present invention relates to an antenna duplexer, more specifically, the antenna duplexer to be used for a microwave band communication equipment or the like.

2. Description of the Related Art

For example, there is a portable telephone system having a plurality of passing bands of a transmitting circuit and a receiving circuit such as NTACS-CDMA. In the case of NTACS-CDMA, the frequency is allotted to 887–901 MHz and 915–925 MHz for the transmission side, and 832–846 MHz and 860–870 MHz for the reception side, having two kinds of passing bands, respectively. Thus, the transmission frequency bandwidth to be required for the transmitting circuit of the antenna duplexer to be used for NTACS-CDMA is 887–925 MHz while the reception frequency bandwidth to be required for the receiving circuit is 832–870 MHz, and both the transmitting circuit and the receiving circuit are required to have the wide passing band of 38 MHz. On the other hand, the separation to be secured to separate the transmission frequency bandwidth from the reception frequency bandwidth is 17 MHz, and the separation between the two becomes extremely small.

The antenna duplexer synthesizes the phase of the transmitting circuit with the phase of the receiving circuit. In the case of NTACS-CDMA, the transmitting circuit is set to be of high impedance (open) at the reception frequency bandwidth of 832–870 MHz, and the receiving circuit is set to be of high impedance (open) at the transmission frequency bandwidth of 887–925 MHz to ideally synthesize the phase of the transmitting circuit with the phase of the receiving circuit.

FIG. 11 is an example of the circuit of a conventional antenna duplexer 81. In FIG. 11, Tx denotes a transmitting terminal, Rx denotes a receiving terminal, ANT denotes an antenna terminal, 82–85 denote resonators of a transmitting circuit 100, C31–C34 denote coupling capacitors to determine the magnitude of the attenuation in the blocking bandwidth, C35–C39 denote capacitors, L31–L34 denote coupling coils, 86–90 denote resonators of a receiving circuit 101, and C40–C45 denote coupling capacitors.

In the conventional antenna duplexer 81, however, the transmission frequency bandwidth and the reception frequency bandwidth are wide, respective in the case of NTACS-CDMA, and the separation between the two is extremely small, and it is practically difficult to set the transmitting circuit 100 to be of high impedance in the reception frequency bandwidth and to set the receiving circuit 101 to be of high impedance in the transmission frequency bandwidth.

FIG. 12 is a Smith chart of the antenna duplexer 81. In FIG. 12, P1, P2, P3 and P4 respectively indicates the impedance at the frequency of 832 MHz, 870 MHz, 887 MHz, and 925 MHz of the receiving circuit 101 viewed from a branch point A in FIG. 11. The frequency 832 MHz is the frequency at a low frequency side end part of the passing band of the receiving circuit 101 while the frequency 870 MHz is the frequency at a high frequency side end part of the passing band of the receiving circuit 101. The frequency 887 MHz is the frequency at a low frequency side end part of the passing band of the transmitting circuit 100 while the frequency 925 MHz is the frequency at a high frequency side end part of the passing band of the transmitting circuit 100. FIG. 12 shows that the impedance of the receiving circuit 101 at P3 of the frequency of 887 MHz is low, and the insertion loss of the antenna duplexer 81 in transmission is increased. To cope with the problem, $Q_0$ is increased by increasing the size of the dielectric resonator of the transmitting circuit and the receiving circuit in order to obtain the steep attenuation curve, but there raises another problem that the size of the antenna duplexer 81 is increased.

As a method for miniaturizing the antenna duplexer, a proposal is made that the dielectric resonator is used in the transmitting circuit and the surface acoustic wave filter element is used in the receiving circuit. (For example, refer to Japanese Unexamined Patent Publication No. 5-95204.) However, it is difficult to set the transmitting circuit to be of high impedance at the reception frequency bandwidth or to set the receiving circuit to be of high impedance at the transmission frequency bandwidth though the antenna duplexer can be miniaturized by using the surface acoustic wave filter element, and the insertion loss in the transmission and reception can not be improved. It is more rather superior in the characteristic aspect to compose the transmitting circuit and the receiving circuit of the dielectric resonator.

Also, as the method to set the transmitting circuit to be of high impedance at the reception frequency bandwidth and to set the receiving circuit to be of high impedance at the transmission frequency bandwidth, an antenna duplexer 121 illustrated in FIG. 13 capable of switching two kinds of the passing bands of a transmitting circuit 130 and a receiving circuit 131 is proposed. In FIG. 13, Tx denotes a transmitting terminal, Rx denotes a receiving terminal, ANT denotes an antenna terminal, CONT denotes a voltage control terminal, 122 and 123 denote resonators of the transmitting circuit 130, 124–127 denote resonators of the receiving circuit 131, L35 and L44 denote coupling coils, C50 and C51 denote coupling capacitors to determine the magnitude of the attenuation of the blocking region, C52 and C53 denote capacitors, C54–C59 denote frequency variable bandwidth capacitors, D11–D16 denote PIN diodes, L36–L41 denote choke coils. R11, R12 and C60, C61 denote resistors and capacitors for supplying the control voltage, respectively, L42, L43 and C62 denote coils and a capacitor to constitute the phase shifter, respectively, C63–C65 denote coupling capacitors, and C66 and C67 denote a multi-pass capacitors to polarize the receiving circuit 131. The transmitting circuit 130 constitutes a variable bandwidth blocking circuit while the receiving circuit 131 constitutes the variable band passing circuit.

The antenna duplexer 121 can apparently set the transmission frequency bandwidth and the reception frequency bandwidth to be small, and to increase the separation between the two. However, there is a problem that the antenna duplexer 121 is not suitable for miniaturization because it requires one of the PIN diodes D11–D16 and one of the choke coils L36–L41 for each of the resonators 122–127. In addition, degradation of the resonance system $Q_0$ ($Q_0$ is the Q at the center frequency) is not avoided because the PIN diodes D11–D16 and the capacitors C54–C59 are connected to a large number of resonators 122–127 in parallel. In particular, the insertion loss of the receiving circuit 131 to constitute the band passing circuit is dependent on the resonance system $Q_0$, and electric degradation of the receiving circuit 131 is remarkable.

SUMMARY OF THE INVENTION

The object of the present invention is to provide an antenna duplexer which is small in degradation of $Q_0$ of the resonance system, small in insertion loss and compact in size.

A preferred embodiment of the present invention provides an antenna duplexer, comprising: a transmitting terminal; a receiving terminal; an antenna terminal; a transmitting circuit electrically connected between said transmitting terminal and said antenna terminal, said transmitting circuit comprising at least one first resonator and a first element electrically connected to said first resonator and electrically changing the capacitance by the control voltage; and a receiving circuit electrically connected between said receiving terminal and said antenna terminal, said receiving circuit comprising at least one second resonator, a second element electrically connected to said second resonator and electrically changing the capacitance by the control voltage, and a surface acoustic wave filter element.

In the above described antenna duplexer, at least one selected from the group consisting of said first resonator and second resonator may be a dielectric resonator, and at least one selected from the group consisting of said first element electrically changing the capacitance and said second element electrically changing the capacitance may be a variable capacitance diode or a PIN diode, and the variable capacitance diode or the PIN diode may be electrically connected between an internal conductor of said dielectric resonator and a grounded external conductor of said dielectric resonator.

In the above described antenna duplexer, said transmitting circuit may comprise a variable bandwidth blocking filter circuit and a first phase shifter, and said receiving circuit may comprise a variable trap circuit, a second phase shifter and a surface acoustic wave filter circuit.

According to the present invention, the first element electrically changing the capacitance of the transmitting circuit is controlled by the voltage, and the passing band of the transmitting circuit is switched, and the passing band of the receiving circuit is switched to the frequency of the transmitting circuit to apparently reduce the transmission frequency bandwidth of the transmitting circuit and the reception frequency bandwidth of the receiving circuit, and to increase the separation between the two, and to suppress the insertion loss of the transmitting circuit and the receiving circuit. The number of resonators of the receiving circuit and the number of diodes, etc. to be connected to the resonators can be greatly reduced by employing the surface acoustic wave filter element in the receiving circuit. The loss of the transmitting circuit can be suppressed by providing the trap circuit in the receiving circuit. As a result, the antenna duplexer which is less in degradation of $Q_0$ of the resonance system, low in the insertion loss, and compact in size.

Other features and advantages of the present invention will become apparent from the following description of preferred embodiments of the invention which refers to the accompanying drawings, wherein like reference numerals indicate like elements to avoid duplicative description.

DETAILED DESCRIPTION OF THE PREFERRED EMBODIMENTS

[First Preferred Embodiment FIG. 1 Through FIG. 8]

Figure 1:
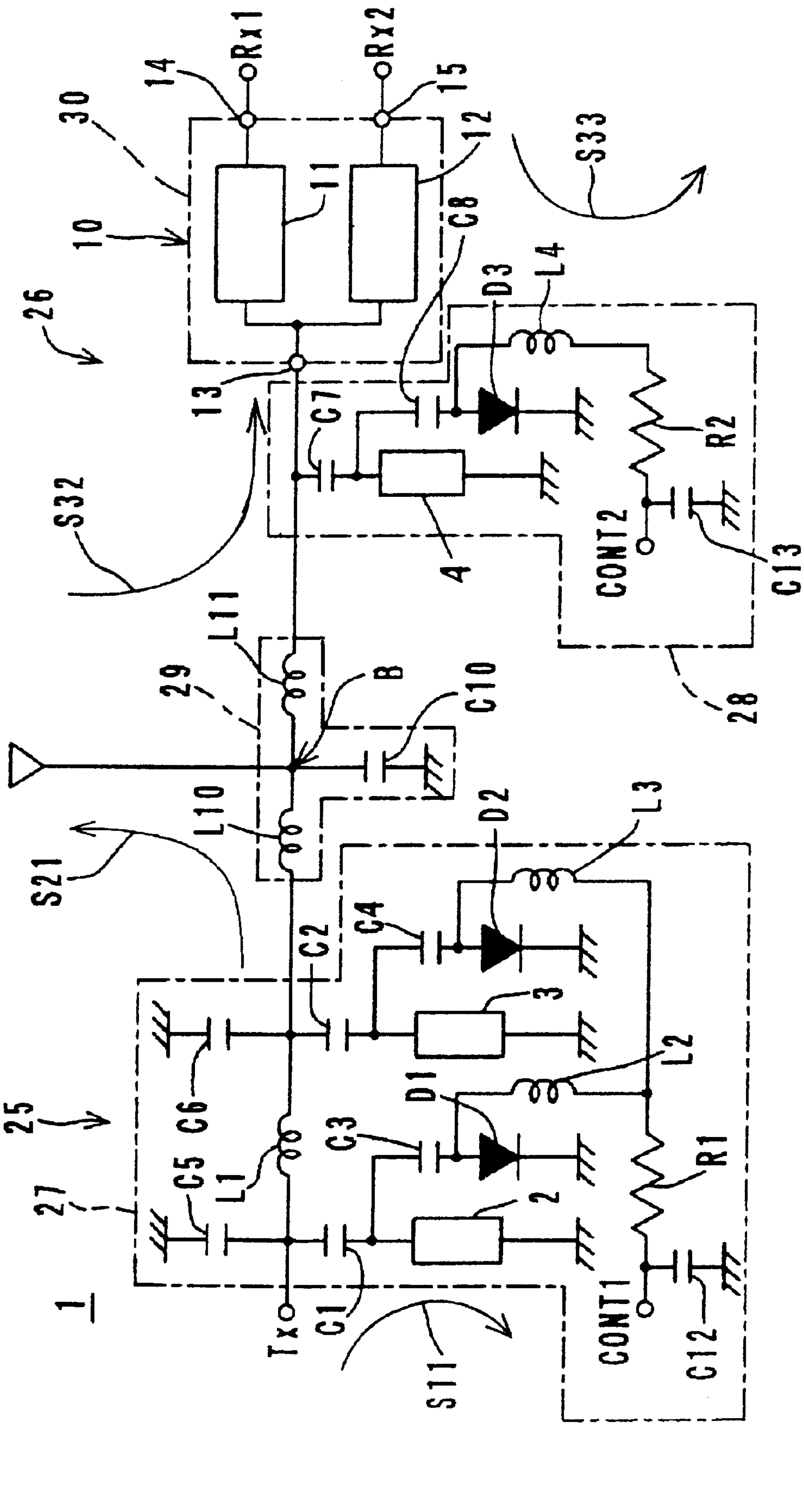
FIG. 1 is an electric circuit illustrating the constitution of the first preferred embodiment of the antenna duplexer of the present invention.

FIG. 1 is a circuit constitution of an antenna duplexer 1. In the antenna duplexer 1, a transmitting circuit 25 is electrically connected between a transmitting terminal Tx and an antenna terminal ANT, and a receiving circuit 26 is electrically connected between receiving terminals Rx1, Rx2 and the antenna terminal ANT.

The transmitting circuit 25 comprises a frequency variable bandwidth blocking filter circuit 27 and a first phase shifter 29. The bandwidth blocking filter circuit 27 comprises a resonator 2 to be electrically connected to the transmitting terminal Tx through a capacitor C1 for resonance, and a resonator 3 to be electrically connected to the first phase shifter 29 through a capacitor C2 for resonance. The capacitors C1, C2 for resonance are those to determine the magnitude of the attenuation of the blocking bandwidth. The series resonance circuit of the resonator 2 and the capacitor C1 for resonance is electrically connected to the series resonance circuit of the resonator 3 and the capacitor C2 for resonance through a coil L1 for coupling. In addition, capacitors C5, C6 are electrically connected in parallel to these two series resonance circuits.

A series circuit of a variable bandwidth capacitor C3 and a PIN diode D1 is electrically connected in parallel to a resonator 2 in a condition where a cathode of the PIN diode D1 is grounded at an intermediate connection point of the resonator 2 to the capacitor C1 for resonance. Similarly, a series circuit of a variable bandwidth capacitor C4 and a PIN diode D2 is electrically connected in parallel to a resonator 3 in a condition where a cathode of the PIN diode D2 is grounded at an intermediate connection point of the resonator 3 to the capacitor C2 for resonance. The variable bandwidth capacitors C3, C4 are used to change two attenuation polar frequencies of the attenuation characteristic of the frequency variable bandwidth blocking filter circuit 27.

A voltage control terminal CONT1 is electrically connected to an intermediate connection point of an anode of the PIN diode D1 to the variable bandwidth capacitor C3 through a resistor R1 for supplying the control voltage, a capacitor C12, and a choke coil L2, and at the same time, electrically connected to an intermediate connection point of an anode of the PIN diode D2 to the variable bandwidth capacitor C4 through the resistor R1 for supplying the control voltage, the capacitor C12 and the choke coil L13.

The first phase shifter 29 is a T-shaped circuit comprising a coil L10 which is electrically connected between the bandwidth blocking filter circuit 27 and the antenna terminal ANT; the capacitor C10 which is electrically connected between the ground and the antenna terminal ANT, and a coil L11 which is electrically connected between a frequency variable trap circuit 28 (to be mentioned below) of the receiving circuit 26, and the antenna terminal ANT.

The receiving circuit 26 comprises the frequency variable trap circuit 28, the second phase shifter 29 and a surface acoustic wave filter circuit 30. In a case of the receiving circuit 26 of the first embodiment, the second phase shifter 29 is shared by a transmitting circuit 25, but it goes without saying that the transmitting circuit 25 and the receiving circuit 26 may be provided with each independent phase shifter.

The surface acoustic wave filter circuit 30 is provided with surface acoustic wave filter elements 11, 12 which are respectively connected between the receiving terminals Rx1, Rx2 and the second phase shifter 29. The surface acoustic wave filter element 11 has the passing band of 832–846 MHz while the surface acoustic wave filter element 12 has the passing band of 860–870 MHz. The number of resonators and the number of diodes, etc., to be connected to the resonators can be greatly reduced by employing these surface acoustic wave filter elements 11,12.

Figure 2:
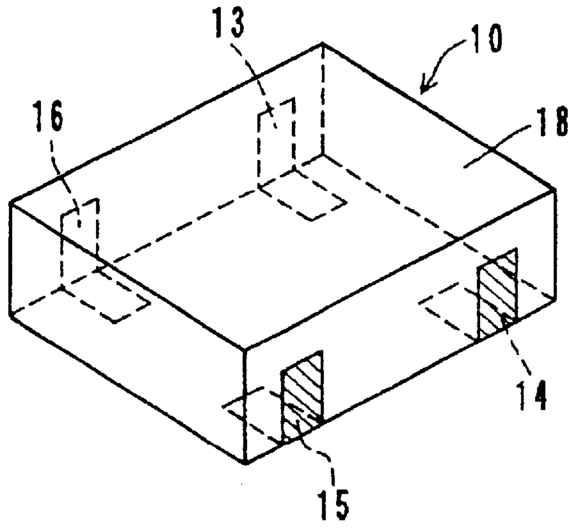
FIG. 2 is a perspective view illustrating the appearance of a surface acoustic wave filter to be used for the antenna duplexer illustrated in FIG. 1.

The surface acoustic wave filter circuit 30 comprises surface acoustic wave filter parts 10 provided with an input terminal 13, a ground terminal 16, and two output terminals 14,15 on two end face parts opposite to each other of a rectangular case 18 as illustrated in FIG. 2. The surface acoustic wave filter elements 11,12 are arranged inside the case 18 though they are not illustrated in FIG. 2, each input side of the filter elements 11,12 is connected to the common input terminal 13, the output side of the filter element 11 is connected to an output terminal 14, and the output side of the filter element 12 is connected to an output terminal 15. That means, the surface acoustic wave filter parts 10 are of one-input and two-output type, and suitable for miniaturization of the antenna duplexer. In a case of the first preferred embodiment, the surface acoustic wave filter parts 10 of 3.8 mm in length, 3.8 mm in width, and 1.5 mm in height is used.

The frequency variable trap circuit 28 is provided with the resonator 4 which is electrically connected through the capacitor C7 for resonance at the intermediate connection point of the surface acoustic wave filter circuit 30 and the second phase shifter 29. The series circuit of the variable bandwidth capacitor C8 and the PIN diode D3 is electrically connected in parallel to the resonator 4 in a condition where a cathode of the PIN diode D3 is grounded at the intermediate connection point of the resonator 4 to the capacitor C7 for resonance. The voltage control terminal CONT2 is electrically connected to the intermediate connection point of an anode of the PIN diode D3 to the variable bandwidth capacitor C8 through the resistor R2 for supplying the control voltage, the capacitor C13, and a choke coil L4.

Figure 3:
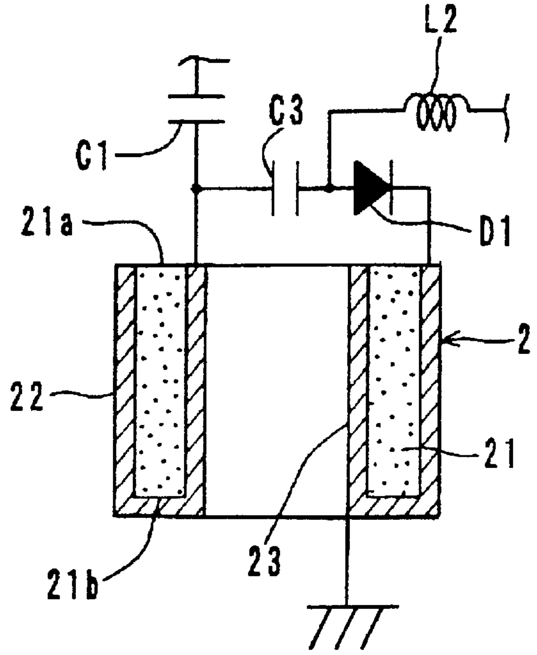
FIG. 3 is a sectional view illustrating one example of a dielectric resonator to be used for the antenna duplexer illustrated in FIG. 1.

A dielectric resonator is used in the resonators 2–4, as illustrated in FIG. 3. FIG. 3 illustrates the resonator 2 as an example. The dielectric resonators 2–4 comprise a cylindrical dielectric body 21 formed of the highly dielectric material such as $TiO_2$ ceramics, an external conductor 22 provided on the outer circumferential surface of the cylindrical dielectric body 21, and an internal conductor 23 provided on the inner circumferential surface of the cylindrical dielectric body 21. The external conductor 22 is electrically opened (disconnected) from the internal conductor 23 at one open end face 21*a* (hereinafter, referred to as the open side end face 21*a*) of the dielectric body 21, and electrically short-circuited (conducted) to the internal conductor 23 at the other open end face 21*b* (hereinafter, referred to as the short-circuited end face 21*b*). In the dielectric resonator 2, the series circuit of the variable bandwidth capacitor C3 and the PIN diode D1 is electrically connected at the open end face 21*a* in a condition where one end of the variable bandwidth capacitor C3 is connected to the internal conductor 23, and the cathode of the PIN diode D1 is connected to the external conductor 22.

Similarly, in the dielectric resonator 3, the series circuit of the variable bandwidth capacitor C4 and the PIN diode D2 is electrically connected at the open end face 21*a* in a condition where one end of the variable bandwidth capacitor C4 is connected to the internal conductor 23, and the cathode of the PIN diode D2 is connected to the external conductor 22. In the dielectric resonator 4, the series circuit of the variable bandwidth capacitor C8 and the PIN diode D3 is electrically connected at the open end face 21*a* in a condition where one end of the variable bandwidth capacitor C8 is connected to the internal conductor 23, and the cathode of the PIN diode D3 is connected to the external conductor 22. In the dielectric resonators 2, 3, and 4, the external conductor is grounded at the short-circuited end face 21*b*.

The operation and advantages of the antenna duplexer 1 of the above-mentioned constitution are explained hereinafter. In the antenna duplexer 1, the transmission signal received by the transmitting terminal Tx from the transmitting circuit system is outputted from the antenna terminal ANT through the transmitting circuit 25, and the reception signal received by the antenna terminal ANT is outputted from the receiving terminals Rx1,Rx2 to the receiving circuit system through the receiving circuit 26.

The trap frequency of the frequency variable bandwidth blocking filter circuit 27 of the transmitting circuit 25 is determined by each resonance frequency of the resonance system comprising the variable bandwidth capacitor C3, the capacitor C1 for resonance, and the resonator 2, and the resonance system comprising the variable bandwidth capacitor C4, the capacitor C2 for resonance, and the resonator 3. When the positive voltage as the control voltage is applied to the voltage control terminal CONT1, the PIN diodes D1, D2 are in the ON-condition. Thus, the variable bandwidth capacitors C3, C4 are respectively grounded through the PIN diodes D1, D2, two attenuation polar frequencies are reduced, and the passing band of the transmitting circuit 25 becomes 887–901 MHz.

On the contrary, when the negative voltage is applied as the control voltage, the PIN diodes D1,D2 are in the OFF-condition. The variable bandwidth capacitors C3, C4 are thus in the open condition, two attenuation polar frequencies are both increased, and the passing band of the transmitting circuit 25 becomes 915–925 MHz.

Figure 4:
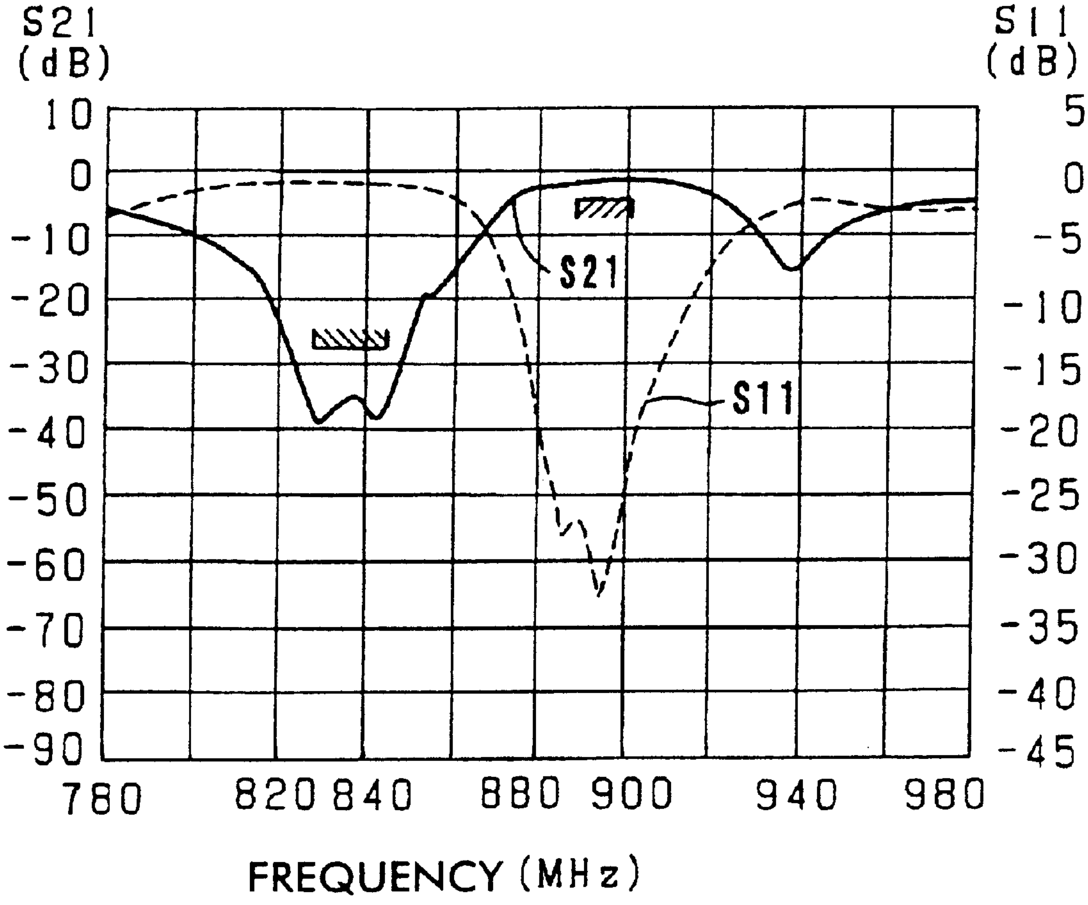
FIG. 4 is a graph illustrating the transmission and reflection characteristics of the transmitting circuit illustrated in FIG. 1 when 887–901 MHz is selected as the passing band.
Figure 5:
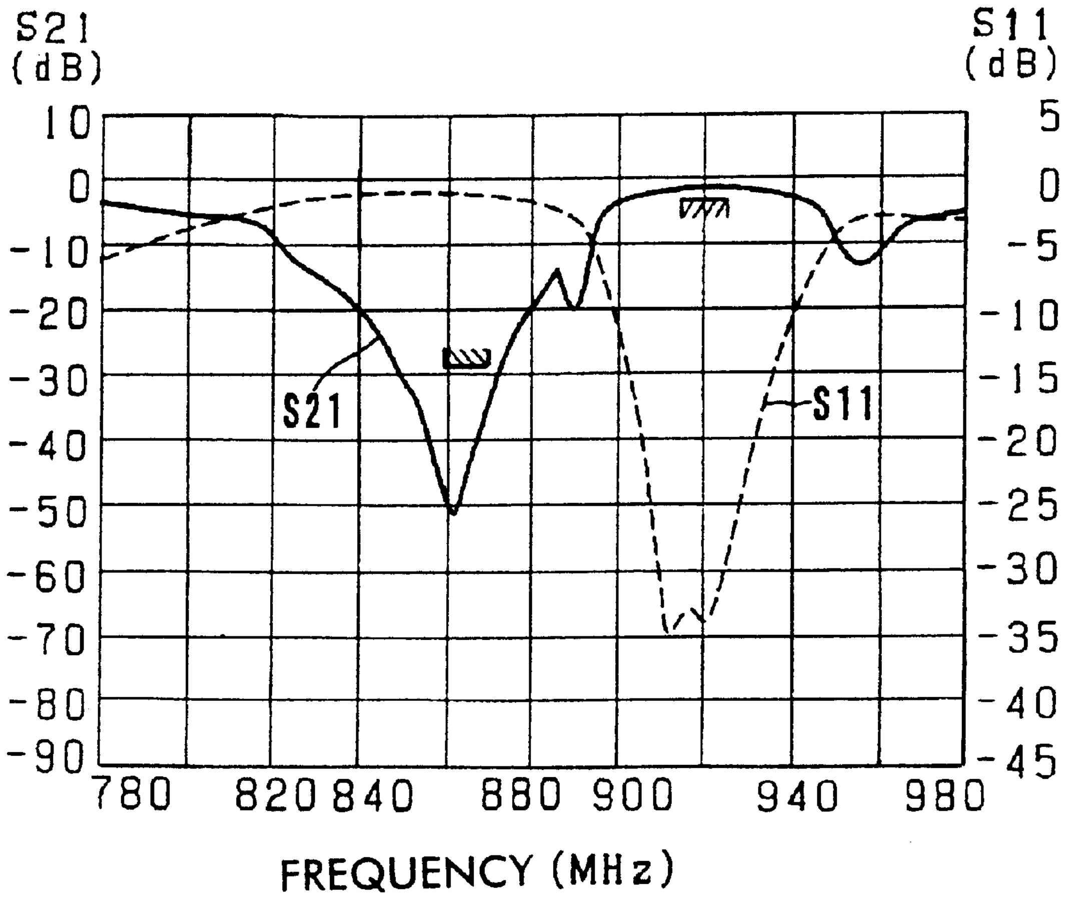
FIG. 5 is a graph illustrating the transmission and reflection characteristics of the transmitting circuit illustrated in FIG. 1 when 915–925 MHz is selected as the passing band.

FIG. 4 is a graph illustrating the results of the measurement of the passing characteristic S21 and the reflecting characteristic S11 of the transmitting circuit 25 when 887–901 MHz is selected as the passing band of the transmitting circuit 25. FIG. 5 is a graph illustrating the results of the measurement of the passing characteristic S21 and the reflecting characteristic S11 of the transmitting circuit 25 when 915–925 MHz is selected as the passing band of the transmitting circuit 25. Thus, the transmitting circuit 25 can have two different passing band characteristics by grounding or opening the variable bandwidth capacitors C3,C4 by controlling the voltage.

On the other hand, the receiving circuit 26 outputs only the signal passing the surface acoustic wave filter element 11 when the receiving terminal Rx1 is in the ON-condition and the receiving terminal Rx2 is in the OFF-condition. Thus, the passing band of the receiving circuit 26 becomes 832–846 MHz. On the contrary, the receiving circuit outputs only the signal passing the surface acoustic wave filter element 12 when the receiving terminal Rx1 is in the OFF-condition and the receiving terminal Rx2 is in the ON-condition. Thus, the passing band of the receiving circuit 26 becomes 860–870 MHz.

Figure 6:
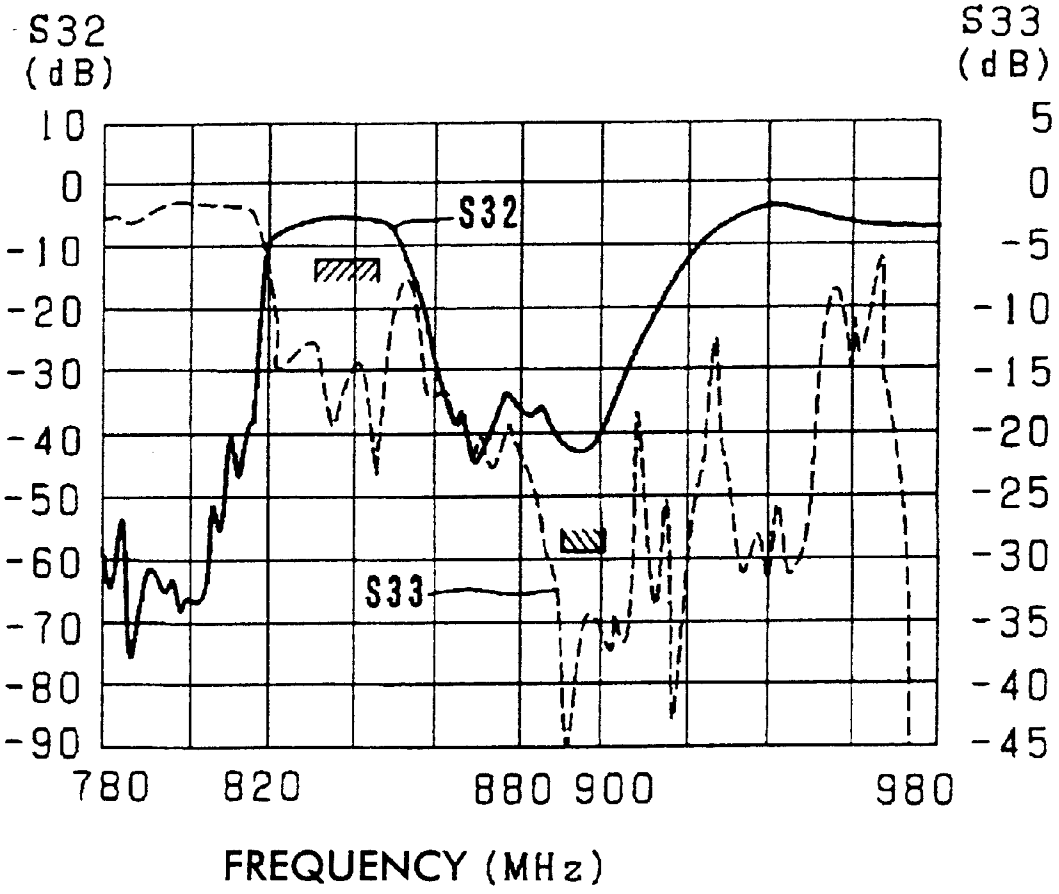
FIG. 6 is a graph illustrating the transmission and reflection characteristics of the receiving circuit illustrated in FIG. 1 when 832–846 MHz is selected as the passing band.
Figure 7:
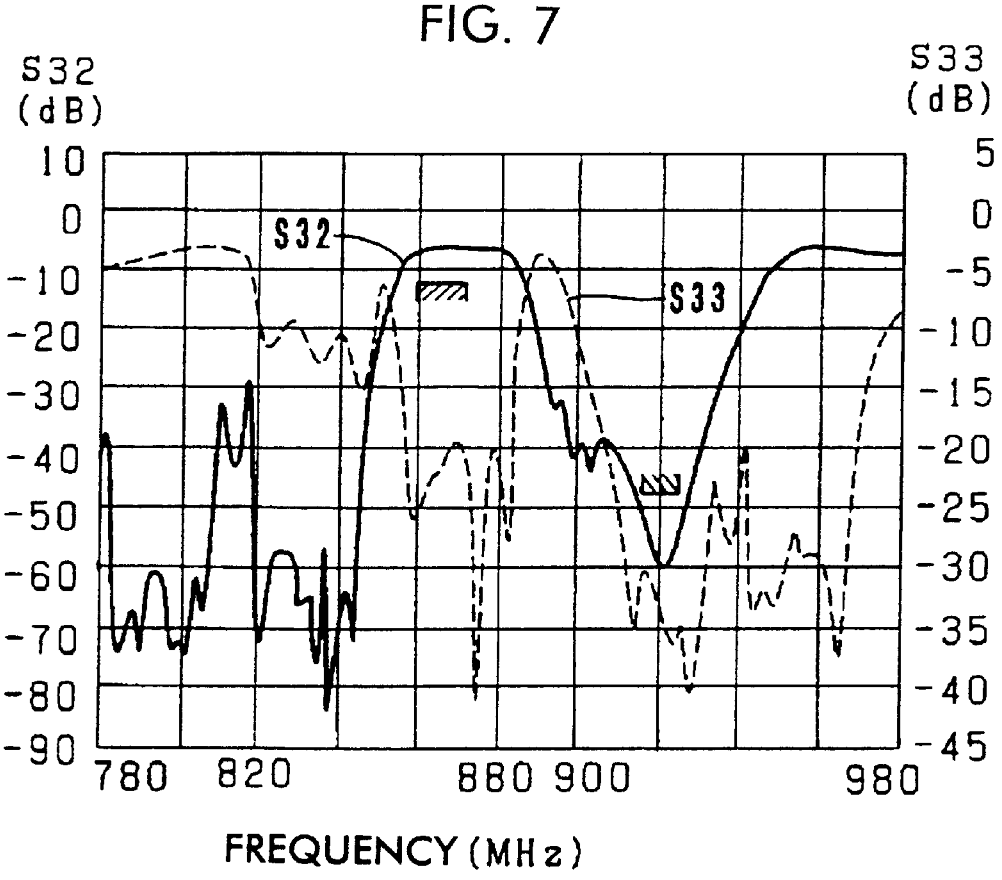
FIG. 7 is a graph illustrating the transmission and reflection characteristics of the receiving circuit illustrated in FIG. 1 when 860–870 MHz is selected as the passing band.

FIG. 6 is a graph illustrating the results of the measurement of the passing characteristic S32 and the reflecting characteristic S33 of the receiving circuit 26 when 832–846 MHz is selected as the passing band of the receiving circuit 26. FIG. 7 is a graph illustrating the results of the measurement of the passing characteristic S32 and the reflecting characteristic S33 of the receiving circuit 26 when 860–870 MHz is selected as the passing band of the receiving circuit 26. Thus, the receiving circuit 26 can have two different passing band characteristics by setting either of the receiving terminal Rx1 or Rx2 in the ON-condition.

In the transmitting circuit 25, when the positive control voltage is applied to the voltage control terminal CONT1 to set the transmission frequency bandwidth of the transmitting circuit 25 to be 887–901 MHz (refer to FIG. 4), the receiving terminal Rx1 is set in the ON-condition and the receiving terminal Rx2 is in the OFF-condition to set the reception frequency bandwidth of the receiving circuit 26 to be 832–846 MHz. (Refer to FIG. 6.) The separation between the transmission frequency bandwidth of the transmitting circuit 25 and the reception frequency bandwidth of the receiving circuit 26 can be increased as high as 55 MHz, and the insertion loss can also be suppressed.

In addition, the transmitting circuit 25 is easily set so that the impedance is high at the reception frequency bandwidth 832–846 MHz (refer to FIG. 4), and the insertion loss of the receiving circuit 26 is not remarkably degraded. Similarly, the receiving circuit 26 is easily set so that the impedance is high at the transmission frequency bandwidth 887–901 MHz (refer to FIG. 6), and the insertion loss of the transmitting circuit 25 is not remarkably degraded.

In the transmitting circuit 25, when the negative control voltage is applied to the voltage control terminal CONT1 to set the transmission frequency bandwidth of the transmitting circuit 25 to be 915–925 MHz (refer to FIG. 5), the receiving terminal Rx1 is set in the OFF-condition and the receiving terminal Rx2 is in the ON-condition to set the reception frequency bandwidth of the receiving circuit 26 to be 860–870 MHz. (Refer to FIG. 7.) The separation between the transmission frequency bandwidth of the transmitting circuit 25 and the reception frequency bandwidth of the receiving circuit 26 can be increased as high as 55 MHz, and the insertion loss can also be suppressed.

In addition, the transmitting circuit 25 is easily set so that the impedance is high at the reception frequency bandwidth 860–870 MHz (refer to FIG. 5), and the insertion loss of the receiving circuit 26 is not remarkably degraded. Similarly, the receiving circuit 26 is easily set so that the impedance is high at the transmission frequency bandwidth 915–925 MHz (refer to FIG. 7), and the insertion loss of the transmitting circuit 25 is not remarkably degraded.

The trap frequency of the frequency variable trap circuit 28 of the receiving circuit 26 is also determined by the resonance frequency of the resonance system comprising the variable bandwidth capacitor C8, the capacitor C7 for resonance and the resonator 4. When the positive voltage is applied to the voltage control terminal CONT2 as the control voltage, the PIN diode D3 is in the ON-condition. Thus, the variable bandwidth capacitor C8 is grounded through the PIN diode D3, and the trap frequency becomes low. On the contrary, when the negative voltage is applied as the control voltage, the PIN diode D3 is in the OFF-condition. Thus, the variable bandwidth capacitor C8 is in the open condition, and the trap frequency becomes high.

In the frequency variable trap circuit 28, the voltage is controlled so that the trap frequency becomes low when 887–901 MHz is selected as the transmitting band to meet the switching of two passing bands of 887–901 MHz and 915–925 MHz of the transmitting circuit 25, while the trap frequency becomes high when 915–925 MHz is selected as the passing band. The phase synthesis with the transmitting circuit 25 can be ideally performed.

The receiving circuit 26 can be easily set to be of high impedance at the transmission frequency bandwidth of 887–901 MHz and 915–925 MHz by providing the frequency variable trap circuit 28 in the receiving circuit 26. Thus, the matching loss of the transmitting circuit 25 with the receiving circuit 26 is suppressed, and the insertion loss of the transmitting circuit 25 is not greatly degraded.

Figure 8:
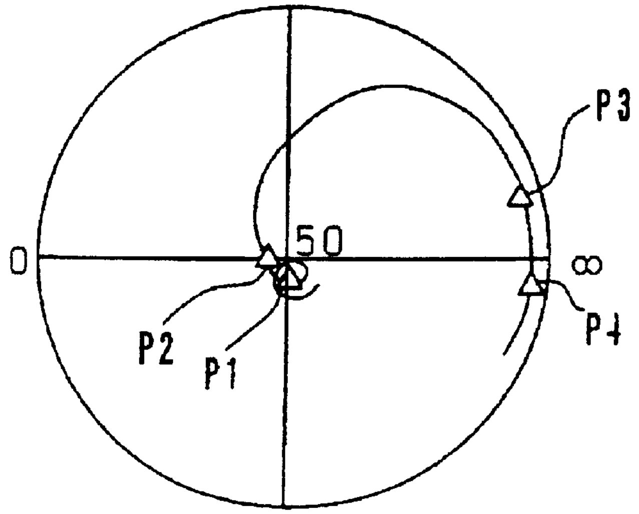
FIG. 8 is a Smith chart of the antenna duplexer illustrated in FIG. 1.
Figure 12:
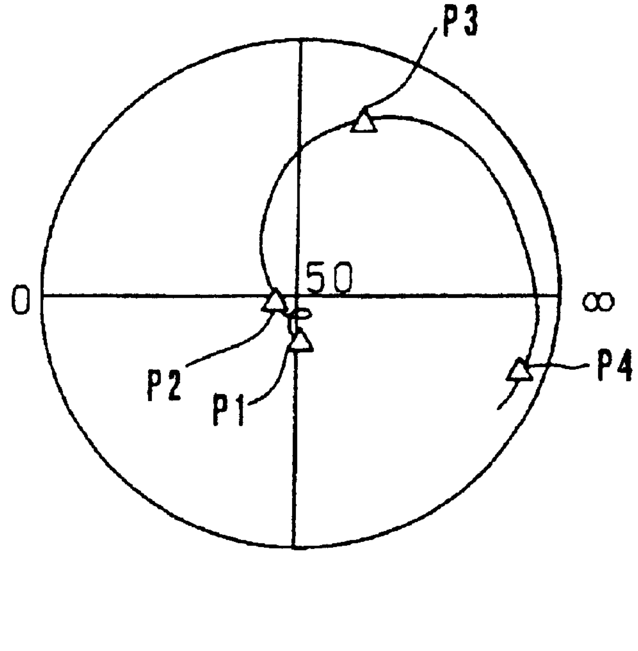
FIG. 12 PRIOR ART
FIG. 12 is a Smith chart of the antenna duplexer illustrated in FIG. 11.
Figure 11:
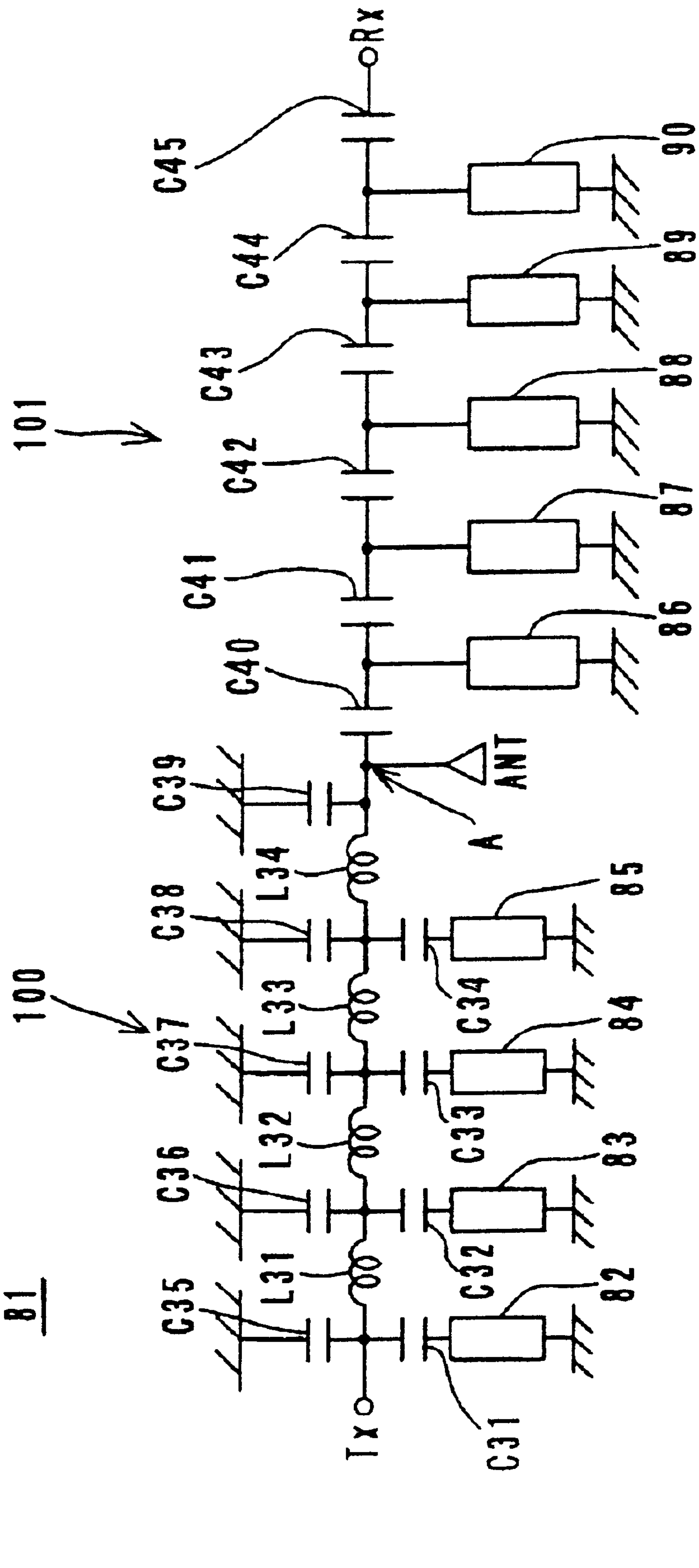
FIG. 11 PRIOR ART
FIG. 11 is an electric circuit diagram illustrating the constitution of a conventional antenna duplexer.
Figure 13:
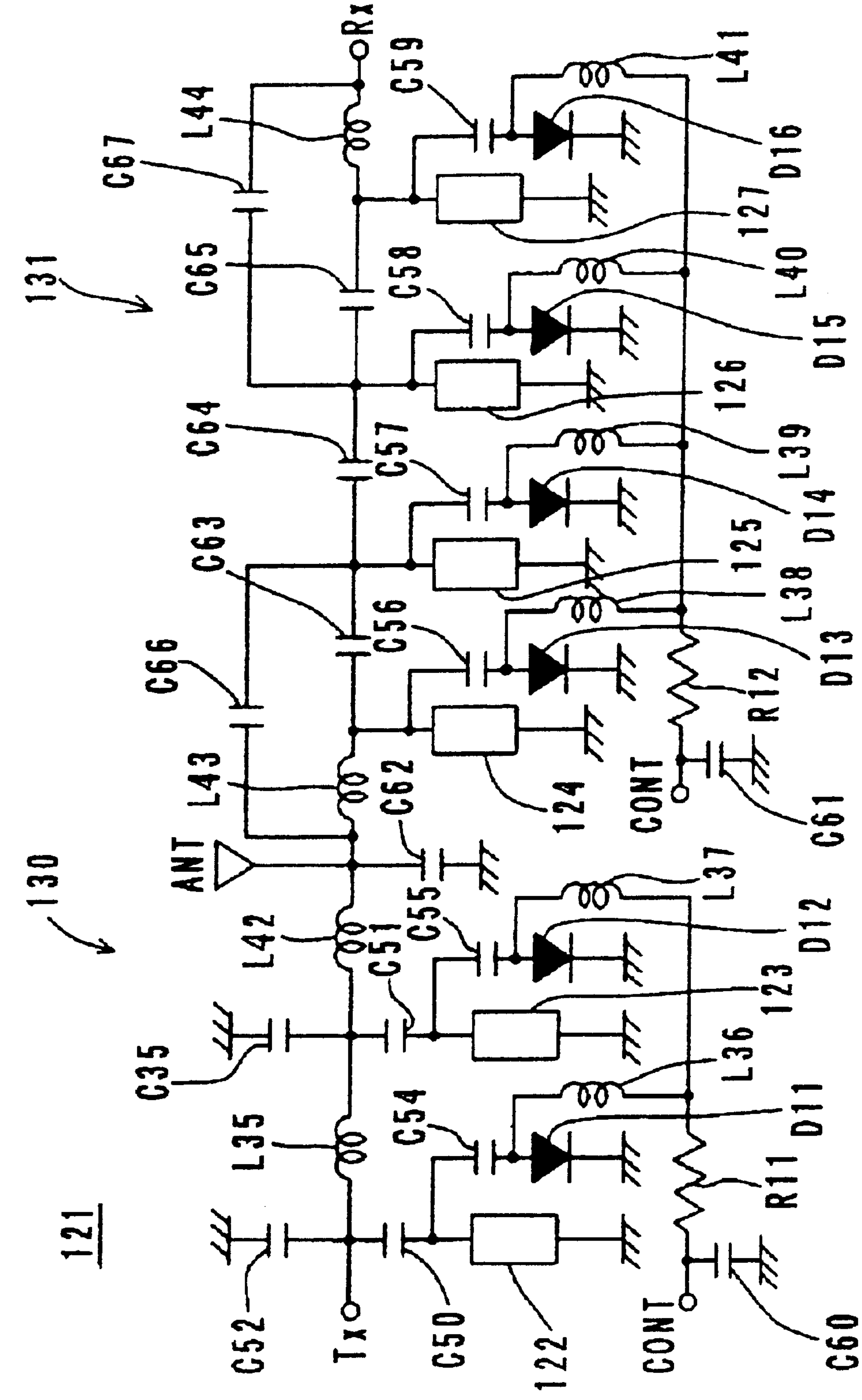
FIG. 13 PRIOR ART
FIG. 13 is an electric circuit diagram illustrating the constitution of another conventional antenna duplexer.

FIG. 8 is a Smith chart of the antenna duplexer 1. In FIG. 8, P1, P2, P3 and P4 indicates the impedance at the frequency 832 MHz, 870 MHz, 887 MHz, and 925 MHz of the receiving circuit 26 viewed from the branch point B in FIG. 1. The frequency 832 MHz is the low frequency side end part of the passing band of the receiving circuit 26, while the frequency 870 MHz is the high frequency side end part of the passing band of the receiving circuit 26. The frequency 887 MHz is the low frequency side end part of the passing band of the transmitting circuit 25 while the frequency 925 MHz is the high frequency side end part of the passing band of the transmitting circuit 25. In comparing FIG. 8 with the Smith chart of the conventional antenna duplexer 81 illustrated in FIG. 12, the antenna duplexer 1 is high in the impedance of the receiving circuit 26 at P3 of the frequency 887 MHz, and it is understood that the insertion loss of the antenna duplexer 1 during the transmission is small.

Figure 9:
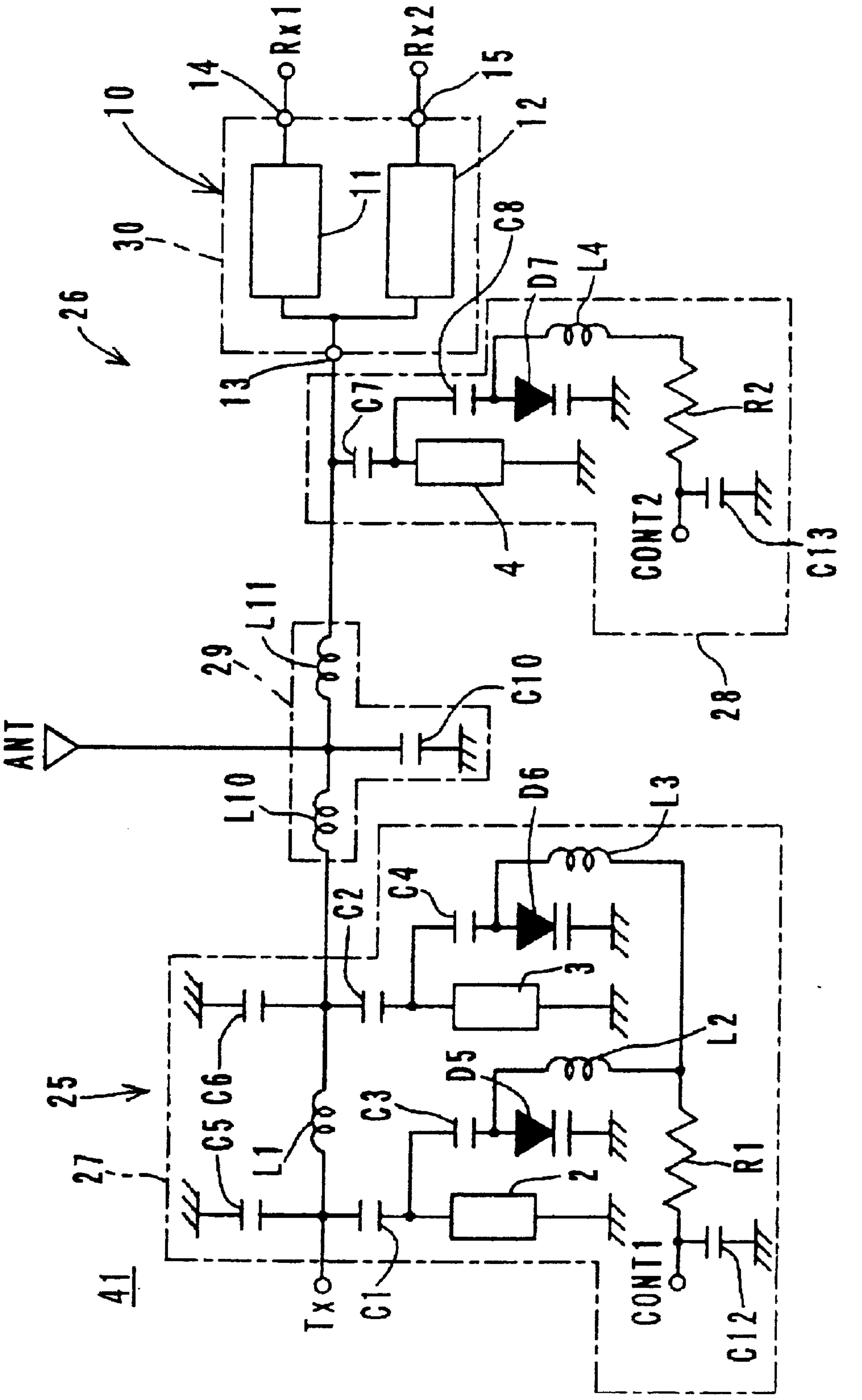
FIG. 9 is an electric circuit diagram illustrating the constitution of the second preferred embodiment of the antenna duplexer of the present invention.
Figure 10:
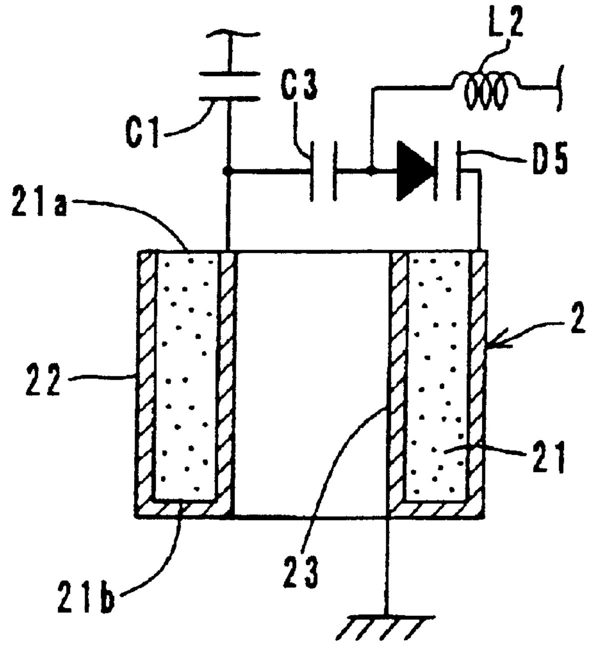
FIG. 10 is a section illustrating one example of the dielectric resonator to be used for the antenna duplexer illustrated in FIG. 9.

[Second Preferred Embodiment, FIG. 9 and FIG. 10]

As illustrated in FIG. 9 and FIG. 10, an antenna duplexer 41 of the second preferred embodiment employs variable capacitance diodes D5–D7 in place of PIN diodes D1–D3 in the antenna duplexer 1 of the embodiment illustrated in FIG. 1 through FIG. 3.

The trap frequency of a frequency variable bandwidth blocking filter circuit 27 of the transmitting circuit 25 is determined by the capacitance of a variable capacitance diode D5, the resonance frequency of the resonance system comprising the variable bandwidth capacitor C3, capacitor C1 for resonance, and the resonator 2, the capacitance of a variable capacitance diode D6, and the resonance frequency of the resonance system comprising the variable bandwidth capacitor C4, the capacitor C2 for resonance and the resonator 3. The capacitance of the variable capacitance diodes D5,D6 is changed by changing the voltage to be applied to the voltage control terminal CONT 1. As a result, the attenuation pole of the frequency variable bandwidth blocking filter circuit 27 is moved, and the trap frequency is changed. Thus, the transmitting circuit 25 can have two different passing bands by changing the capacitance of the variable capacitance diodes D5,D6 by controlling the voltage.

The trap frequency of the frequency variable trap circuit 28 of the receiving circuit 26 is also determined by the capacitance of a variable capacitance diode D7, and the resonance frequency of the resonance system comprising the variable bandwidth capacitor C8, the resonance capacitor C7, and the resonator 4. The capacitance of the variable capacitance diode D7 is changed by changing the voltage to be applied to the voltage control terminal CONT2. As a result, the trap frequency of the frequency variable trap circuit 28 is changed.

In addition, in the dielectric resonator 2 as illustrated in FIG. 10, one end of the variable bandwidth capacitor C3 of the series circuit comprising the variable bandwidth capacitor C3 and the variable capacitance diode D5, is connected to the internal conductor 23 at the open end face 21*a,* and is electrically connected in a condition where the cathode of the variable capacitance diode D5 is connected to the external conductor 22. Similarly, in the dielectric resonator 3, one end of the variable bandwidth capacitor C4 of the series circuit comprising the variable bandwidth capacitor C4 and the variable capacitance diode D6, is connected to the internal conductor 23 at the open end face 21*a,* and is electrically connected in a condition where the cathode of the variable capacitance diode D6 is connected to the external conductor 22. In the dielectric resonator 4, one end of the variable bandwidth capacitor C8 of the series circuit comprising the variable bandwidth capacitor C8 and the variable capacitance diode D7, is connected to the internal conductor 23 at the open end face 21*a,* and is electrically connected in a condition where the cathode of the variable capacitance diode D7 is connected to the external conductor 22.

The antenna duplexer 41 of the second preferred embodiment takes similar effect to that of the antenna duplexer 1 of the first embodiment.

[Other Embodiment]

The antenna duplexer of the present invention is not limited to the above-mentioned embodiments, but can be changed diversely in the range of the summary. For example, the resonator may be a strip line resonator, etc., in addition to the dielectric resonator. The number of the resonators is arbitrary.

While the invention has been particularly shown and described with reference to preferred embodiments thereof, it will be understood by those skilled man in the art that the forgoing and other changes in form and details may be made therein without departing from the spirit of the invention.

What is claimed is:

1. An antenna duplexer, comprising:

a transmitting terminal;

a receiving terminal;

an antenna terminal;

a transmitting circuit electrically connected between said transmitting terminal and said antenna terminal, said transmitting circuit comprising at least one first resonator and a first element electrically connected to said first resonator and electrically changing a capacitance thereof by a control voltage, said first element switching at least two different passing bands of the transmitting circuit by the control voltage; and a receiving circuit electrically connected between said receiving terminal and said antenna terminal, said receiving circuit comprising at least one second resonator, a second element electrically connected to said second resonator and electrically changing a capacitance thereof by a control voltage, said second element switching at least two different passing bands of the receiving circuit by the control voltage, and at least one surface acoustic wave filter element coupled thereto.

2. The antenna duplexer according to claim 1, wherein at least one selected from the group consisting of said first resonator and second resonator is a dielectric resonator, and at least one selected from the group consisting of said first element electrically changing the capacitance and said second element electrically changing the capacitance is a variable capacitance diode, and the variable capacitance diode is electrically connected between an internal conductor of said dielectric resonator and a grounded external conductor of said dielectric resonator.

3. The antenna duplexer according to claim 1, wherein at least one selected from the group consisting of said first resonator and second resonator is a dielectric resonator, and at least one selected from the group consisting of said first element electrically changing the capacitance and said second element electrically changing the capacitance is a PIN diode, and said PIN diode is electrically connected between an internal conductor of said dielectric resonator and a grounded external conductor of said dielectric resonator.

4. The antenna duplexer according to claim 1, wherein said transmitting circuit comprises a variable bandwidth blocking filter circuit and a first phase shifter, and said receiving circuit comprises a variable trap circuit, a second phase shifter and a surface acoustic wave filter circuit.

5. The antenna duplexer according to claim 1, wherein said receiving circuit comprises two surface acoustic wave filter elements in parallel, the first surface acoustic filter element for one passing band of the receiving circuit and the second surface acoustic filter element for the other passing band of the receiving circuit.

* * * * *